(12) United States Patent
Cao

(10) Patent No.: US 6,946,047 B2
(45) Date of Patent: Sep. 20, 2005

(54) METHOD FOR MANUFACTURING ZIPPER WITHOUT SHIFT IN INJECTION MOLDING

(76) Inventor: Chang-Wen Cao, 235 Chung—Ho Box 8-24, Taipei (TW)

( * ) Notice: Subject to any disclaimer, the term of this patent is extended or adjusted under 35 U.S.C. 154(b) by 335 days.

(21) Appl. No.: 10/042,457

(22) Filed: Jan. 10, 2002

(65) Prior Publication Data

US 2003/0020201 A1 Jan. 30, 2003

(30) Foreign Application Priority Data

Jul. 27, 2001 (TW) ........................................ 90118487 A

(51) Int. Cl.⁷ .............................................. B29C 47/00
(52) U.S. Cl. ........................ 156/245; 425/814; 264/154
(58) Field of Search ................................ 264/154, 155, 264/156, 252, 259, 328.8; 156/66, 91, 244.15, 245; 29/409, 408, 410, 766, 767; 425/545, 814

(56) References Cited

U.S. PATENT DOCUMENTS 5,536,343 A * 7/1996 Kuse ........................ 156/73.3

* cited by examiner

Primary Examiner—Jeff H. Aftergut
Assistant Examiner—John L. Goff

(57) ABSTRACT

A method for manufacturing a zipper without shift in injection molding comprises the steps of forming a bank of continuous zipper teeth at an edge of each of two parallel zipper strips by molding injection; wherein an inner side of each zipper strip has a respective connecting strip; scraping a part of zipper teeth on the zipper strip; melting two layers of films and coating the films on the upper and lower sides of the zipper strip; punching holes at inner lateral sides of the films, but the connecting strips are remained; guiding two zipper strips into an upper and a lower engaging piece molds; and tensioning the zipper strips within the molds; injection-molding engaging pieces; moving the molds from the zipper strips; cutting the zipper strips along the holes, thus forming the upper and lower engaging pieces of a zipper.

1 Claim, 4 Drawing Sheets

METHOD FOR MANUFACTURING ZIPPER WITHOUT SHIFT IN INJECTION MOLDING

FIELD OF THE INVENTION

The present invention relates to zippers, and particularly to a method for manufacturing a zipper without shift in injection molding.

BACKGROUND OF THE INVENTION

The engaging pieces of prior art zippers, especially lower engaging pieces, possibly shift in the manufacturing process since the zipper strips cannot be precisely located on the upper and lower engaging piece molds so that the upper and lower engaging pieces cannot be precisely positioned in the molds. Therefore, the upper and lower engaging pieces have bad appearance.

With reference to FIGS. 1 and 2, the prior art way for manufacturing a zipper is illustrated. The prior art zipper has a left and a right zipper strips 90. Each zipper strip 90 has zipper teeth 91 thereon. A part of the zipper teeth 91 is scraped with a predetermined length. Then two layers of films are melt and then coated on the two sides of the zipper strips 90. Then the two layers of films are punched with notches 93 which are opened. In the punching process, the connecting strip 901 is also punched. Then, lower engaging pieces 94, 95 are injection-molded on the notches, and the upper engaging pieces 96, 97 at the upper side of the films 92 are injected.

In above process, the two layers of films are used to fix the lower engaging pieces of the zipper 9. Other than combining the lower engaging pieces 94, 95 to the films 92, the fingers may pinch this part. The object of forming the notches 93 is that the lower engaging pieces 94, 95 will extend to the notches 93 after they are injection-molded (referring to FIG. 2) so that the bottoms of the lower engaging pieces will not enclose the zipper strips and the films 92. Therefore, the strength of the bottom is larger than other part.

Referring to FIG. 3, the shaping of the lower engaging pieces 94, 95 and the upper engaging pieces 96, 97 must guide the zipper strips into the molds. When the zipper strips are guided into molds so that the zipper strips are precisely positioned in the upper and lower molds. The zipper strips 90 must be tensioned within the mold so as to become straight and thus flat on the molds. However, the films 92 will deform as the zipper strips 90 are tensioned within the mold due to the action of the notches 93 with openings on the films 92 of the zipper strips 90. These notches will cause the widths of the films become smaller. Therefore, the zipper strips are tensioned within the mold and thus the notches 93 will deform. In general the rectangular notches will become trapezoidal notches (referring to FIG. 3) or the films 92 are bent and deformed. Therefore, the engaging pieces can not precisely match the upper and lower molds. After the lower engaging pieces 94, 95 and upper engaging pieces 96, 97 are injection-molded, the zipper strips 9 can be separated from the molds. Then the upper and lower engaging pieces of the released zipper strips 9 (referring to FIG. 4), especially the lower engaging pieces, will shift and dislocate due to the deformation of the films in the injection-molding process. As a result, it is very possible that the upper and lower engaging pieces can not be matched with one another or even a bad outlook appears.

SUMMARY OF THE INVENTION

Accordingly, the primary object of the present invention is to provide a method for manufacturing a zipper without shift in injection molding, wherein the method comprises the steps of forming a bank of continuous zipper teeth at an edge a zipper strip; wherein an inner side of each zipper strip is attached with a connecting strip; scraping a part of zipper teeth on the zipper strip; melting two layers of films and coating the films on the upper and lower sides of the zipper strip; punching a hole at inner lateral sides of the films of each zipper strip and the connecting strips are remained; guiding two zipper strips into an upper and a lower engaging piece molds; and tensioning the zipper strips within the molds; injection-molding upper engaging pieces and injection-molding lower engaging pieces; moving the molds from the zipper strips and removing other undesired objects; cutting the zipper strips along the holes, thus forming the upper and lower engaging pieces of a zipper. When forming the hole, a connecting strip at an edge having the films must be retained. Thereby, the zipper strips can be precisely positioned in the upper engaging piece mold and the lower engaging piece mold.

The various objects and advantages of the present invention will be more readily understood from the following detailed description when read in conjunction with the appended drawing.

DETAILED DESCRIPTION OF THE PREFERRED EMBODIMENT

Figure 1:
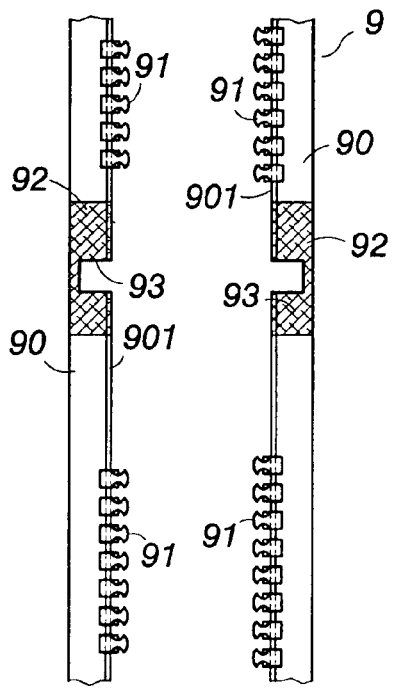
FIG. 1 is a schematic view showing the coating films process in the prior art zipper.
Figure 2:
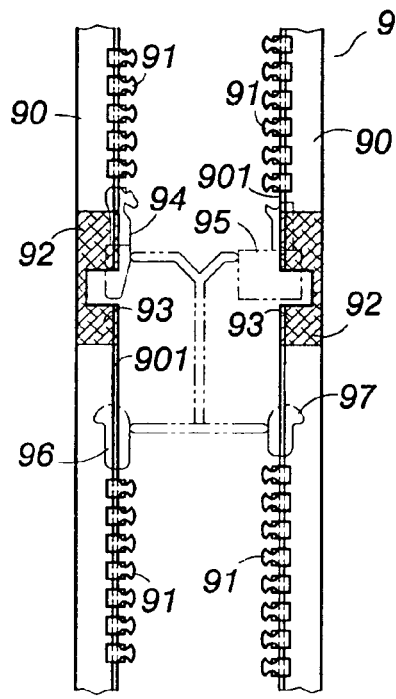
FIG. 2 is a schematic view showing the step of injection-molding the upper and lower engaging pieces in the prior art design.
Figure 3:
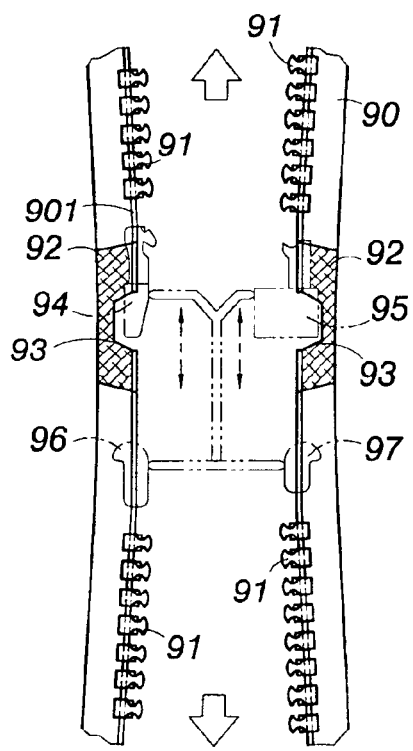
FIG. 3 is a schematic view showing the deformation of the zipper strips in the prior art.
Figure 4:
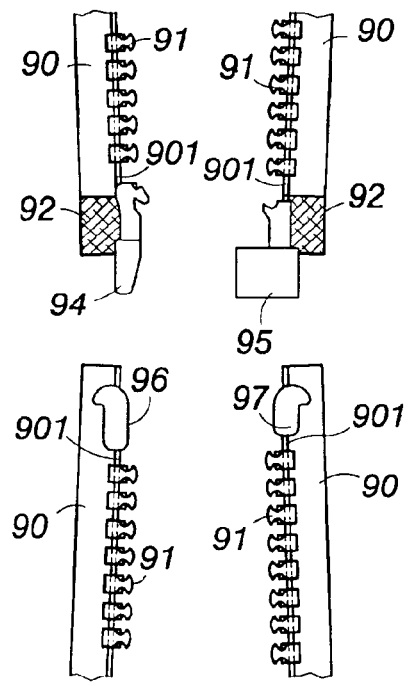
FIG. 4 is a schematic view showing the shift of the prior art zipper after injection molding.
Figure 5:
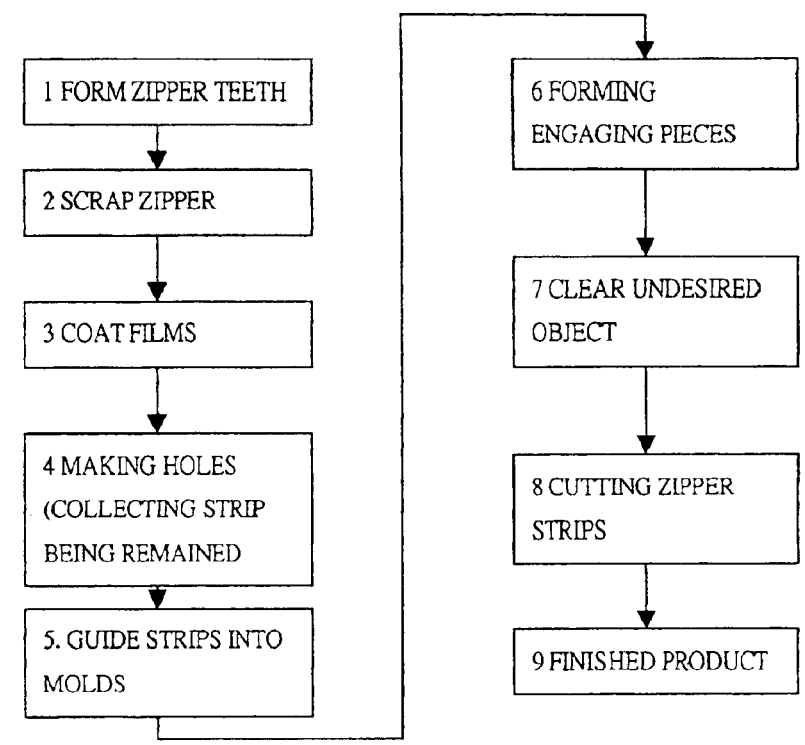
FIG. 5 shows the manufacturing process of the present invention.

The manufacturing process of the present invention has been illustrated in FIG. 5. The present invention comprises the step of forming a bank of continuous zipper teeth on an inner side of one of a pair of parallel zipper strips by molding injection; wherein an inner side of each zipper strips has a respect connecting strip (step 1); scraping a part of zipper teeth on the zipper strip (step 2); by thermal pressing, melting two layers of films and then coating the films on the upper and lower sides of the zipper strip at the part without zipper teeth (step 3); punching holes at inner lateral sides of the films while the connecting strips are left; but the connecting strip is remained (step 4); guiding two zipper strips into an upper and a lower engaging piece mold; tensioning the zipper strip within the molds so as to be placed on the mold flatly and the zipper strips being matched to the upper and lower engaging piece molds (step 5); injection-molding upper engaging pieces at inner sides of the zipper strips and injection-molding lower engaging pieces at inner sides of the films (step 6); moving the molds from the zipper strips and removing other undesired objects (step 7); cutting the zipper strips along the holes, thus forming the upper and lower engaging pieces of a zipper (step 8).

Figures 6, 7:
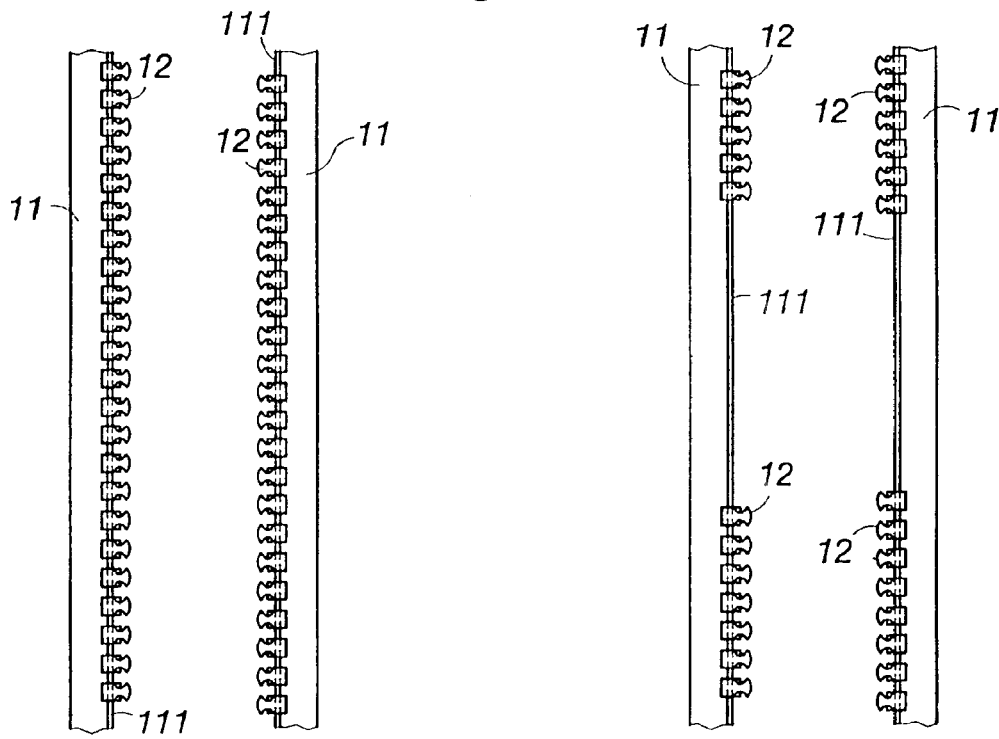
FIG. 6 is a schematic view showing the zipper teeth being formed on the zipper strip of the present invention.
FIG. 7 is a schematic view showing the step of scraping the zipper teeth in the present invention.

The process of forming the present invention is illustrated in FIGS. 6 to 11. FIG. 6 shows the condition of forming zipper teeth (step 1). Two zipper strips 11 are disposed in parallel. The inner side of each zipper strip 11 has a connecting strip 111. A bank of zipper teeth 12 with teeth being spaced with an equal space are injected to the inner side of each zipper strip 11. The zipper teeth 12 clamp the zipper strip 11 steadily by the connecting strip 111. Thereby, the zipper teeth 2 are flexible and can prevent from dropping down due to an outer force applied thereon FIG. 7 shows a condition that the zipper teeth 12 have been scraped (step 2). A part of the zipper teeth 12 with a length of 3 cm is scraped, wherein the length of that part is changeable as required. Now, the zipper strip 11 still remains on the connecting strip 11.

Figure 8:
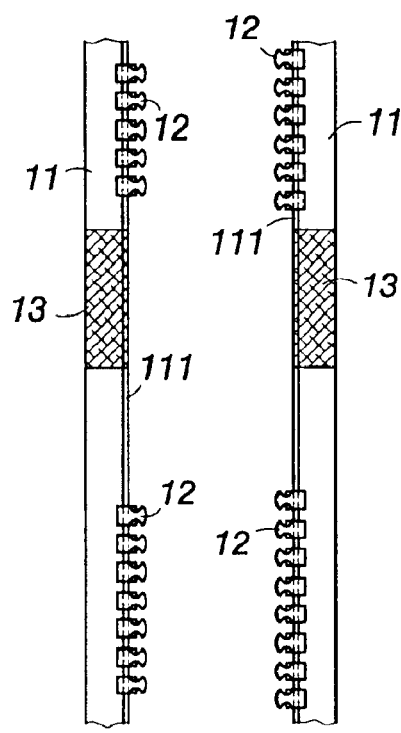
FIG. 8 is a schematic view showing the step of coating films in the present invention.

FIG. 8 shows the process of coating films (step 3). At the part of the zipper strip 11 without zipper teeth 2 near the upper zipper teeth 12, two layers of films 13 are melt and then are fixed to the upper and lower sides of the zipper strip 11 by thermal pressing (for example, supersonic welding). Thereby, the part of the zipper strip 11 having the films is flexible. It has the function of wet and friction-preventing and protecting zipper strip.

Figure 9:
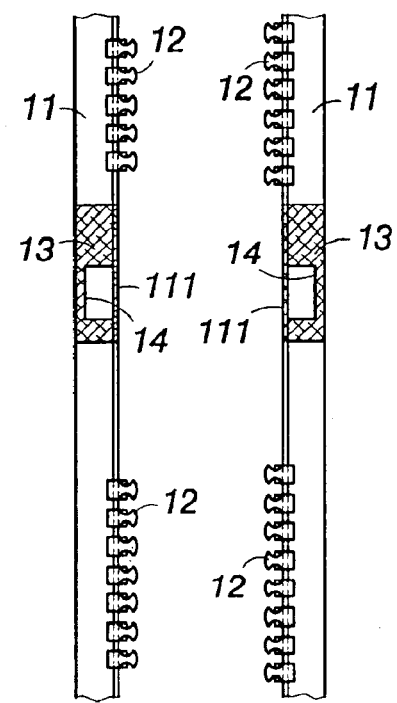
FIG. 9 is a schematic view showing the step of forming a hole on the film of the present invention.

FIG. 9 shows the process of forming holes on the zipper strips (step 4). A hole 14 is formed on the film 13 by punching, while the connecting strip 111 is remained. When two zipper strips 11 are guided into the engaging piece molds (step 5), the inner side of each hole has a completely connecting strip 111, and thereby, as the zipper strip 11 is tensioned within the molds from upper and lower sides. The hole 14 of each zipper strips 11 will not deform due to the flexibility of the connecting strip 111. Furthermore, the film does not become uneven. Therefore, the zipper strip 11 can be precisely located to the upper and lower engaging piece. molds.

Figure 10:
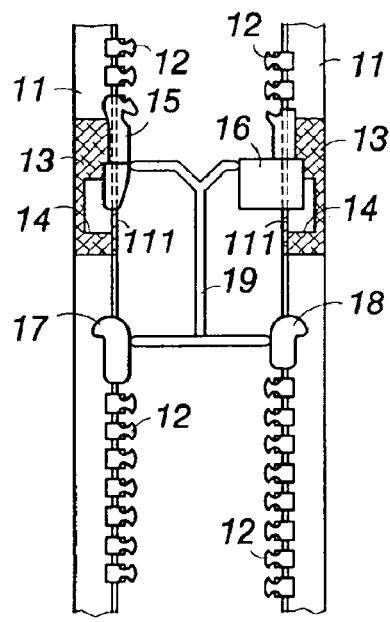
FIG. 10 is a schematic view showing the process of forming the upper and lower engaging pieces in the molds of the present invention.

Referring to FIG. 10, the process of forming the upper and lower engaging pieces (step 6) is illustrated. After injection molding, the upper engaging pieces 17, 18 and lower engaging pieces 15, 16 are precisely located on the zipper strips 11 without shifting or dislocation. Furthermore, the connecting strip 111 passes through the upper and lower engaging pieces.

Figure 11:
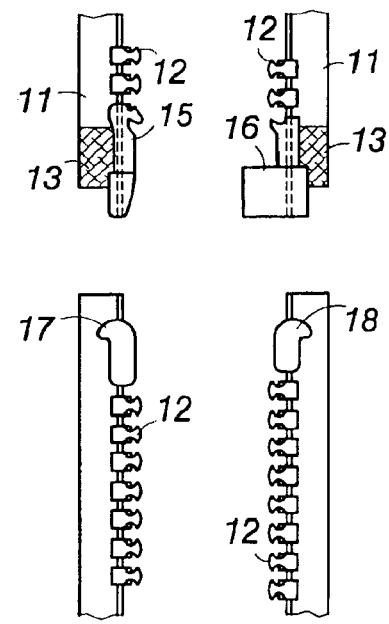
FIG. 11 is a cross sectional view of a finished zipper in the present invention.

FIG. 11 shows a process of cutting zipper strips (step 8). A cutting machine moves along the uppermost side of the hole 14 and then cuts the connecting strip 111 at the lower end of the lower engaging pieces 15, 16.

Figure 12:
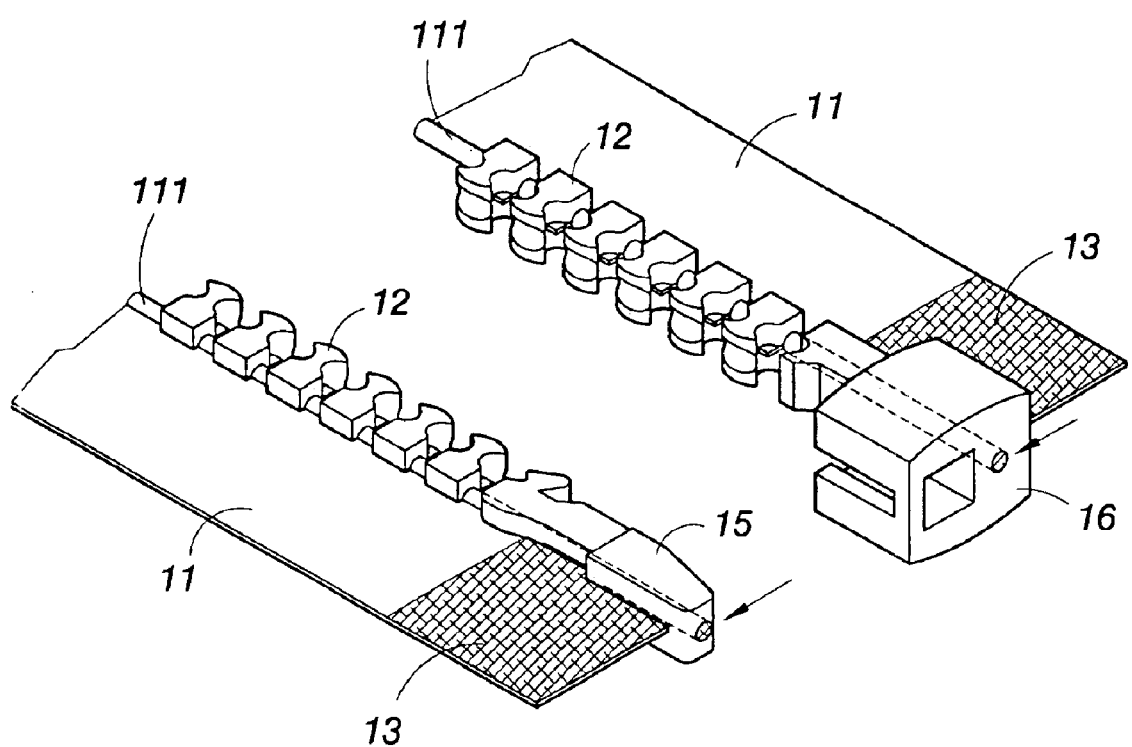
FIG. 12 is a schematic view showing the lower engaging pieces of the present invention.

FIG. 12 shows that the difference of the lower engaging pieces 15 and 16 from the convention ones is that the lower end thereof has cutting traces (as illustrated by an arrow). The conventional lower engaging piece has no cutting surface on the connecting strip 111. However, the lower engaging pieces of the present invention have not been enclosed by films. Therefore, it is stronger in structure. It is unnecessary to worry about the problem of insufficient stress due to the connecting strip 111. Since in some cases the conventional lower engaging pieces shifts due to the manufacturing process and technology. By the present invention, not only the upper and lower engaging pieces are not effected, but also no shift occurs in the manufacturing process.

The present invention are thus described, it will be obvious that the same may be varied in many ways. Such variations are not to be regarded as a departure from the spirit and scope of the present invention, and all such modifications as would be obvious to one skilled in the art are intend to be included within the scope of the following claims.

What is claimed is:

1. A method for manufacturing a zipper without shift in injection molding comprising the steps of:

forming a bank of continuous zipper teeth on an inner side of each of two parallel zipper strips by injection molding; wherein an inner side of each zipper strip has a respective connecting strip;

scraping a part of zipper teeth on each zipper strip;

melting two layers of film so that each film encloses two sides of each zipper strip at the part without zipper teeth by thermal pressing technology;

punching an opening at an inner lateral side of each film and the opening passing through each zipper strip, but the connecting strip at an inner side of the zipper strip is remained and one side of the opening is adjacent to the connecting strip;

guiding the two zipper strips into upper and lower engaging piece molds; and tensioning the zipper strips within the mold so as to place the zipper strips on the molds flatly;

injection-molding upper engaging pieces at inner sides of the zipper strips and injection-molding lower engaging pieces at inner sides of the films, wherein the lower engaging pieces are protruding into the openings; removing the molds from the zipper strips and removing other undesired objects; and cutting the zipper strips through the openings, thus forming the engaging pieces of a zipper;

wherein in the step of forming the opening, the connecting strip at an edge having the films must be retained for fixing the zipper teeth; when the zipper strips are tensioned within the molds, the zipper strips will resist against a pulling force applied thereon; thereby, the zipper strips are precisely positioned in the upper engaging piece mold and the lower engaging piece mold.

* * * * *